United States Patent
Kar et al.

(10) Patent No.: US 7,024,301 B1
(45) Date of Patent: Apr. 4, 2006

(54) METHOD AND APPARATUS TO CONTROL FUEL METERING IN AN INTERNAL COMBUSTION ENGINE

(75) Inventors: Krishnendu Kar, Webster, NY (US); Andrew P. Bagnasco, Plymouth, MI (US); Sergio Eduardo Garcia, Webster, NY (US); Edward George Himes, Pittsford, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/036,212

(22) Filed: Jan. 14, 2005

(51) Int. Cl.
*F02D 41/14* (2006.01)

(52) U.S. Cl. ........................ 701/104; 123/478
(58) Field of Classification Search ................ 701/104, 701/103, 109, 102; 123/478, 698, 480; 73/118.2
See application file for complete search history.

(56) References Cited

U.S. PATENT DOCUMENTS

| | | | |
|---|---|---|---|
| 4,048,964 A * | 9/1977 | Kissel | 701/104 |
| 5,714,683 A | 2/1998 | Maloney | 514/14 |
| 5,753,805 A | 5/1998 | Maloney | 73/118.2 |
| 5,865,158 A | 2/1999 | Cleveland et al. | 123/478 |
| 6,016,460 A | 1/2000 | Olin et al. | 701/102 |
| 6,233,922 B1 | 5/2001 | Maloney | 701/109 |
| 6,293,267 B1 | 9/2001 | Smith et al. | 123/568.22 |
| 6,446,618 B1 * | 9/2002 | Hill | 123/698 |
| 6,518,763 B1 | 2/2003 | Sollart | 324/378 |

FOREIGN PATENT DOCUMENTS

EP     0 349 811 A1 *    1/1990

* cited by examiner

*Primary Examiner*—Hieu T. Vo
(74) *Attorney, Agent, or Firm*—Jimmy L. Funke

(57) ABSTRACT

A system and method for controlling fuel delivery through a fuel injection system to an internal combustion engine is described. An engine controller calculates a mass of fuel for delivery to one of the cylinders through one of the fuel injectors, based upon the operation of the internal combustion engine. Gas temperature in the intake runner of the cylinder is determined, and a compensation term is selected based upon the calculated mass of fuel and the determined gas temperature in the intake runner of the cylinder. The calculated mass of fuel is adjusted using the compensation term, and the controller controls open time of the fuel injector based upon the adjusted calculated mass of fuel.

12 Claims, 4 Drawing Sheets

COMPENSATION TERMS

| TBRUNST (K) | BASE PULSE WIDTH (MS) | | | | | | | | | | | | | | | |
|---|---|---|---|---|---|---|---|---|---|---|---|---|---|---|---|---|
| | 1.2 | 1.4 | 1.6 | 1.8 | 2 | 2.2 | 2.4 | 2.6 | 2.8 | 3 | 3.2 | 3.4 | 4 | 5 | 6 | 8 | 14 |
| 253 | 0.968 | 0.968 | 0.968 | 0.986 | 0.986 | 0.997 | 0.97 | 0.972 | 0.974 | 0.976 | 0.978 | 0.98 | 0.986 | 0.994 | 1 | 1 | 1 |
| 273 | 0.968 | 0.968 | 0.968 | 0.986 | 0.986 | 0.997 | 0.97 | 0.972 | 0.974 | 0.976 | 0.978 | 0.98 | 0.986 | 0.994 | 1 | 1 | 1 |
| 283 | 0.968 | 0.968 | 0.968 | 0.986 | 0.986 | 0.997 | 0.97 | 0.972 | 0.974 | 0.976 | 0.978 | 0.98 | 0.986 | 0.994 | 1 | 1 | 1 |
| 293 | 1 | 1 | 1 | 1 | 0.986 | 0.997 | 1.002 | 0.999 | 0.997 | 0.997 | 0.997 | 0.997 | 0.997 | 0.997 | 1 | 1 | 1 |
| 303 | 1 | 1 | 1 | 1 | 1 | 1 | 1 | 1 | 1 | 1 | 1 | 1 | 1 | 1 | 1 | 1 | 1 |
| 313 | 1 | 1 | 1 | 1 | 1 | 1 | 1 | 1 | 1 | 1 | 1 | 1 | 1 | 1 | 1 | 1 | 1 |
| 323 | 1 | 1 | 1 | 1 | 1 | 1 | 1 | 1 | 1 | 1 | 1 | 1 | 1 | 1 | 1 | 1 | 1 |
| 333 | 1.07 | 1.07 | 1.07 | 1.028 | 1.028 | 1.039 | 1.04 | 1.04 | 1.042 | 1.045 | 1.045 | 1.045 | 1.045 | 1.045 | 1.045 | 1.045 | 1 |
| 343 | 1.1 | 1.1 | 1.1 | 1.049 | 1.049 | 1.06 | 1.072 | 1.08 | 1.081 | 1.083 | 1.085 | 1.085 | 1.085 | 1.085 | 1.085 | 1.07 | 1 |
| 353 | 1.13 | 1.13 | 1.13 | 1.065 | 1.065 | 1.076 | 1.087 | 1.098 | 1.108 | 1.091 | 1.085 | 1.085 | 1.085 | 1.085 | 1.085 | 1.085 | 1 |
| 363 | 1.13 | 1.13 | 1.13 | 1.089 | 1.14 | 1.14 | 1.15 | 1.15 | 1.15 | 1.15 | 1.13 | 1.1 | 1.085 | 1.085 | 1.085 | 1.085 | 1 |
| 373 | 1.13 | 1.13 | 1.13 | 1.14 | 1.14 | 1.14 | 1.15 | 1.15 | 1.15 | 1.15 | 1.13 | 1.1 | 1.085 | 1.085 | 1.085 | 1.085 | 1 |
| 383 | 1.13 | 1.13 | 1.13 | 1.14 | 1.14 | 1.14 | 1.15 | 1.15 | 1.15 | 1.15 | 1.13 | 1.1 | 1.085 | 1.085 | 1.085 | 1.085 | 1 |
| 403 | 1.13 | 1.13 | 1.13 | 1.14 | 1.14 | 1.14 | 1.15 | 1.15 | 1.15 | 1.15 | 1.13 | 1.1 | 1.085 | 1.085 | 1.085 | 1.085 | 1 |

FIG. 3

METHOD AND APPARATUS TO CONTROL FUEL METERING IN AN INTERNAL COMBUSTION ENGINE

TECHNICAL FIELD

This invention pertains generally to internal combustion engine control systems, and more specifically to a method and apparatus to control mass delivery of fuel to an engine.

INCORPORATION BY REFERENCE

Applicant incorporates by reference U.S. Pat. No. 5,845,627: Internal Combustion Engine Pneumatic State Estimator, issued to Olin, et al., to describe a pneumatic state estimation program to estimate intake and exhaust manifold pressure, and need not be fully described in detail herein.

Applicant incorporates by reference U.S. Pat. No. 5,931,140: Internal Combustion Engine Thermal State Model, issued to Maloney, to describe a thermal state estimation program to estimate intake manifold gas temperature, and need not be fully described in detail herein.

Applicant incorporates by reference U.S. Pat. No. 6,003,496: Transient Fuel Compensation, issued to Maloney, to describe a method to estimate temperature of an air intake valve, and need not be fully described in detail herein.

BACKGROUND OF THE INVENTION

A typical engine control system for a modern internal combustion engine includes an electronic controller operable to monitor engine operating conditions and operator inputs, and operable to control various systems and actuators based upon the monitored conditions and inputs. The typical engine control system is electrically connected to a plurality of engine and vehicle sensors which monitor engine operating conditions and operator demands. Monitored operating conditions may include, for example, engine rotational speed and position, engine load, vehicle speed, engine coolant temperature, intake air temperature, engine air/fuel ratio, accessory demands, and the operator's demand for power. The engine control system is operably connected to engine and powertrain actuators and systems that act to control the engine, in response to the engine operating conditions and operator demands. Typical actuators and systems include, for example, fuel injectors, fuel pump, idle air control valve, exhaust gas recirculation valve, throttle control valve, cam phasing actuator, valve actuators, transmission solenoids, and an exhaust system. A skilled practitioner designs and implements software algorithms and calibrations which are executed in the electronic controller to monitor the engine operating conditions and operator demands, and control the engine actuators accordingly. The software algorithms and calibrations are typically inserted into software of the engine controller during engine development, prior to start of production.

The control system includes a fuel system operable to precisely meter a quantity of fuel to the engine to meet operator demands for power and to meet increasingly stringent emissions requirements. The fuel system for the conventional spark-ignition, multi-cylinder engine typically includes a fuel tank with a fuel pump that is capable of pumping a volume of high pressure fuel through a fuel line to a fuel rail, for distribution to a plurality of fuel injectors. Typically a fuel injector corresponds to each cylinder of the engine. Each fuel injector is preferably positioned to deliver a quantity of fuel through a runner of an intake manifold of the engine so the fuel is delivered at or near an intake valve to the cylinder. A typical fuel injector comprises a solenoid valve that opens and closes a pintle valve in response to an electrical signal delivered by the engine controller. An injector calibration, in the form of a lookup table or an equation, is inserted into the software of the engine controller for use by the control algorithms. The injector calibration consists of a range of mass fuel flow values which correspond to a range of open times of the injector solenoid.

A primary function of the fuel control delivery system is to deliver a requisite mass of fuel to the engine to meet operator demands while also ensuring the engine meets the requisite emissions requirements. The engine controller operates to determine a mass amount of fuel to deliver to a cylinder, based upon engine operating conditions and operator demands. The controller further calculates an amount of time, or pulsewidth, the corresponding fuel injector must be open to deliver the mass amount of fuel to the cylinder, based upon the calibration. The controller actuates the injector solenoid for the calculated pulsewidth to deliver the appropriate mass amount of fuel. The engine controller typically uses correction factors to adjust the calculated pulsewidth to accommodate minor differences caused by variations between engines and engine components, and variations over the life of an engine.

The ability of the control system to accurately deliver a quantity of fuel is affected by the temperature at the point of delivery, i.e., at a tip of each fuel injector. An internal combustion engine is subjected to a range of ambient temperatures and operating temperatures, as is well-known. Temperature variations in and around the engine and its components may affect fuel density, thus affecting the mass of fuel delivered per unit of time. Temperature variations may have an effect on opening and closing characteristics of a fuel injector, thus affecting the mass of fuel delivered per injection event. Engineers have documented a shift in mass of fuel delivered by as much as 15% due to high ambient temperatures, and as much as 20% under hot restart conditions. This shift in delivery of mass of fuel is attributable to changes in fuel injector performance due to injector operating temperature. Operating temperature has been shown to affect injector opening and closing performance, thus affecting fuel flow during fuel injector opening and closing. Fuel density is affected by changes in fuel temperature as it passes through the fuel system and the fuel injector. Therefore, there is a need to develop an engine control system that accurately delivers a predetermined quantity of fuel, unaffected by the temperature at the point of delivery. The intended result is to improve fuel control and reduce fueling errors over a range of ambient temperatures and ambient conditions, especially during a hot-restart condition, thus improving driveability and emissions performance. The invention may also permit design improvements in fuel injectors and related components that take advantage of the performance enhancements gained with the invention.

SUMMARY OF THE INVENTION

The present invention provides an improvement over conventional engine controls by supplying a system and method for controlling fuel delivery through a fuel injection system to a multicylinder internal combustion engine. The exemplary engine includes an air intake system with an intake runner to each cylinder, and a fuel injection system with fuel injectors operable to deliver fuel to one of the intake runners. The system is controlled by an on-board engine controller. The engine controller is operable to calculate a mass of fuel for delivery to one of the cylinders through one of the fuel injectors, based upon the operation of the internal combustion engine. Gas temperature in the intake runner of the cylinder is determined, and a compensation term is selected based upon the calculated mass of fuel and the determined gas temperature in the intake runner of the cylinder. The calculated mass of fuel is adjusted using the compensation term, and the controller controls open time of the fuel injector based upon the adjusted calculated mass of fuel. These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein:

FIG. 3 is a calibration multiplier table in accordance with the present invention; and, FIG. 4 is a data graph in accordance with the present invention.

DETAILED DESCRIPTION OF AN EMBODIMENT OF THE INVENTION

Figure 1:
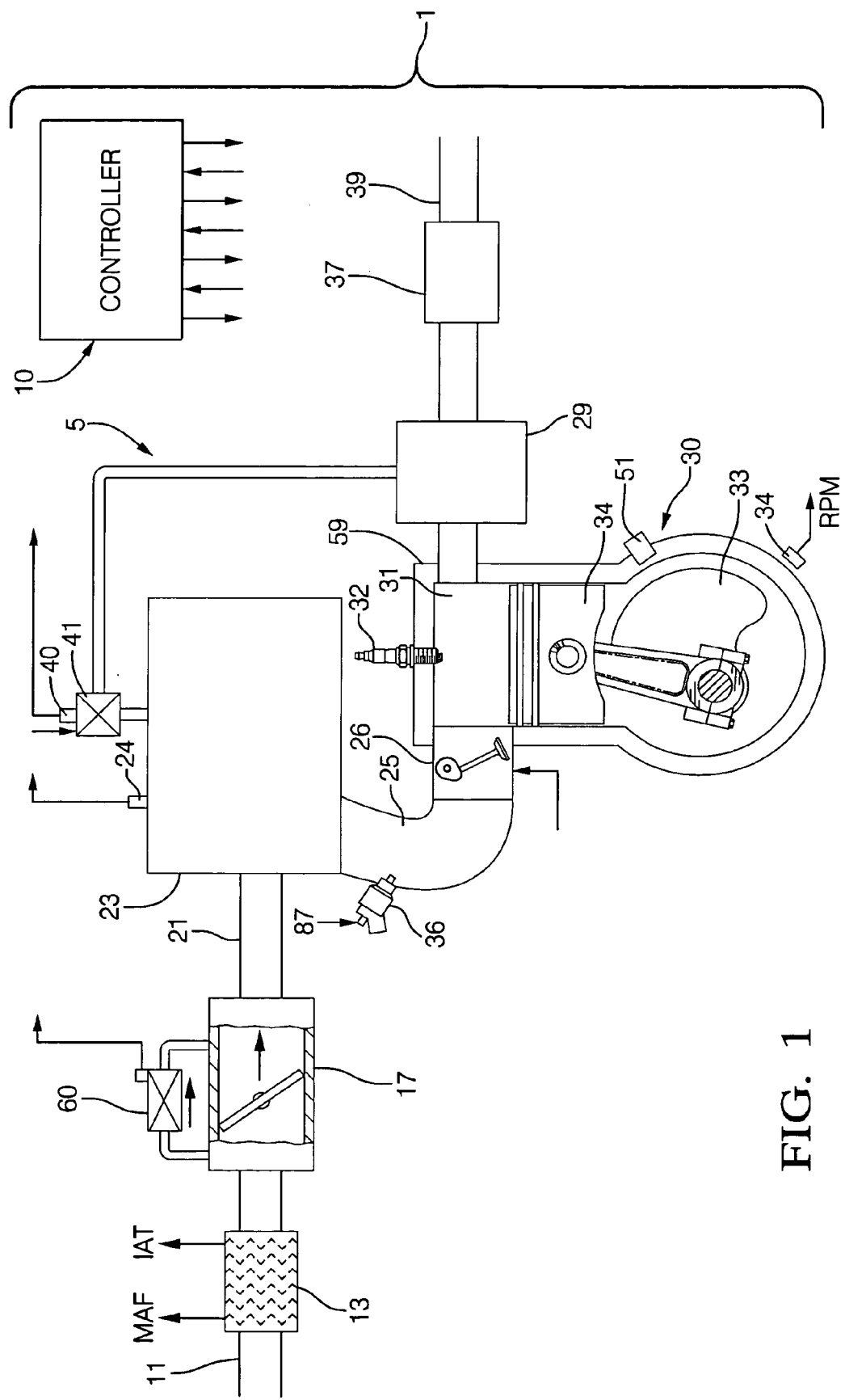
FIG. 1 is a schematic diagram of an engine and control system, in accordance with the present invention.

Referring now to the drawings, wherein the showings are for the purpose of illustrating the invention only and not for the purpose of limiting the same, FIG. 1 shows an internal combustion engine and control system 1 which has been constructed in accordance with an embodiment of the present invention.

The exemplary internal combustion engine is a spark-ignition port fuel injection engine 5 that includes base engine components, sensing devices, output systems and devices, and a control system. The exemplary control system comprises an electronic controller 10 containing various software algorithms and calibrations, signally connected to a plurality of engine and vehicle sensors, and operably connected to a plurality of output devices. The controller 10 includes at least one microprocessor, associated memory devices, input devices for monitoring input from external analog and digital devices, and output drivers for controlling output devices. The controller 10 is operable to monitor engine operating conditions and operator inputs using the plurality of sensors, and control engine operations with the plurality of output systems and actuators, using the pre-established algorithms and calibrations that integrate information from monitored conditions and inputs. A skilled practitioner designs and implements software algorithms and calibrations which are executed in the electronic controller 10 to monitor the engine operating conditions and operator demands using the plurality of sensors, and control the plurality of engine actuators accordingly. The software algorithms and calibrations are preferably inserted into software of the engine controller 10 during engine development, prior to start of production.

The base engine components include an engine block 30 with a plurality of cylinders. Each cylinder contains a piston 34 operably attached to a crankshaft 33 at a point eccentric to an axis of rotation of the crankshaft 33. There is a head 59 at the top of each piston 34 containing one or more air intake valves 26 and one or more exhaust valves (not shown), and a spark plug 32. A combustion chamber 31 is formed within the cylinder between the piston 34 and the head 59. An intake manifold is fluidly connected to the engine head 59, substantially adjacent the air intake valves 26. The intake manifold is connected to an air control valve 17, and includes a common air inlet 21 into a plenum 23 which flows into a plurality of parallel intake runners 25. The plurality of parallel intake runners 25 is preferably formed to permit flow of substantially equal volumes of air from the air control valve 17 to each of the plurality of cylinders. An exhaust manifold 29 is fluidly connected to the engine head 59, substantially adjacent the exhaust valves, and facilitates flow of exhaust gases away from the engine to the exhaust system 37, 39.

The plurality of sensing devices of the exemplary internal combustion engine 5 are operable to measure ambient conditions, various engine conditions and performance parameters, and operator inputs. Typical sensors include a crank sensor 34, a cam position sensor (not shown), a manifold absolute pressure sensor 24, a throttle position sensor (not shown), a mass air flow sensor 13, an intake air temperature sensor (shown as an element of the mass air flow sensor 13), a coolant temperature sensor 51, an exhaust gas recirculation (EGR) position sensor 40, and one or more oxygen sensors or other exhaust gas sensors (not shown).

The plurality of output systems and devices of the exemplary internal combustion engine 5 are operable to control various elements of the engine, and include an air intake system, a fuel injection system, an ignition system, an exhaust gas recirculation (EGR) valve 41 and system, a purge control system (not shown) and an exhaust system 37, 39. The air intake system is operable to deliver filtered air to the combustion chamber 31 when the intake valve(s) 26 open. The air intake system preferably includes an air filtering system fluidly connected to the air control valve 17, which is fluidly connected to the intake manifold. There is a plurality of fuel injectors, with each fuel injector 36 preferably placed in corresponding intake runner 25 at an end of the runner adjacent to the engine head 59, substantially near the intake valve(s) 26 to the cylinder. Design of an air intake system, including all of the aforementioned components, is well known to one skilled in the art. The exemplary fuel delivery and injection system comprises a fuel storage tank with a high-pressure fuel pump (not shown) that provides fuel to a fuel line and fuel rail (not shown) to deliver fuel to each of the plurality of fuel injectors 36. In this embodiment, each fuel injector 36 is fluidly connected and operable to deliver a quantity of fuel to one of the plurality of intake runners 25. Each fuel injector 36 is operably connected to the engine controller 5 via electrical connection 87, which controls the open time of each fuel injector, as described hereinafter. Mechanization of an internal combustion engine, using sensors, output devices, and the controller 10 including development of algorithms and calibrations, is well known to one skilled the art.

In operation, a combustion charge comprising a mixture of air and fuel is inlet through the air intake valve 26 into the combustion chamber 31, and is ignited by the spark plug 32, according to predetermined conditions. Ignition of the air/fuel mixture causes an increase in pressure in the combustion chamber 31, forcing the piston 34 to move linearly along the length of the cylinder, away from the head 59. The movement of the piston 34 in turn causes the crankshaft 33 to rotate. The crankshaft 33 causes the piston 34 to again move toward the head 59 after the crankshaft 33 has rotated to a furthest point of eccentricity. The operation of the spark-ignition internal combustion engine is well known to one skilled in the art.

Figure 2:
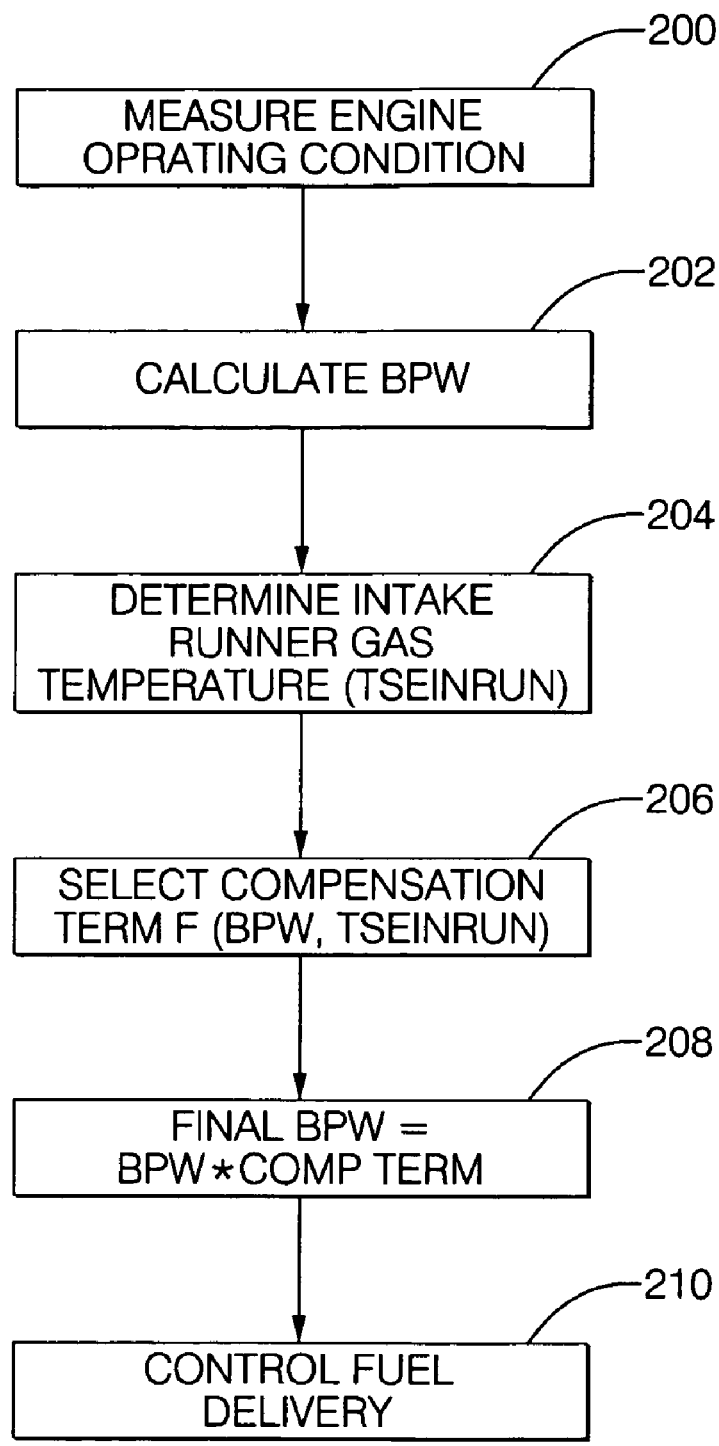
FIG. 2 is a process flow diagram for controlling an internal combustion engine, in accordance with the present invention.

Referring now to FIG. 2, an algorithm is shown that calculates a mass of fuel for delivery (translated into injector open time, or base pulsewidth) to one of the cylinders through the corresponding fuel injector (Block 202), based upon operating conditions (Block 200) of the internal combustion engine. Temperature of gas in the intake runner 25 is determined by the controller (Block 204). The controller 10 selects a compensation term based upon the calculated mass of fuel and the determined gas temperature in the intake runner 25 of the cylinder (Block 206), and adjusts the calculated mass of fuel using the compensation term (Block 208). The controller 10 controls open time of each fuel injector 36 based upon the adjusted calculated mass of fuel, such that the adjusted calculated mass of fuel is delivered to the cylinder (Block 210). This operation is detailed hereinafter.

The engine controller 10 calculates mass of fuel for delivery to one of the cylinders through the corresponding fuel injector 36 (in total grams of fuel), based upon operation of the internal combustion engine. Mass of fuel for delivery is generally calculated by determining mass of air being delivered to the specific cylinder, and determining a desired air/fuel ratio. The mass of fuel to be delivered is equal to the mass of air divided by the air/fuel ratio, and may include other correction factors to compensate for ambient conditions, engine state, component variation, and/or system variation. Determination of the mass of fuel to be delivered in this manner is generally known to one skilled in the art, and is not described in detail hereinafter.

Figure 4:
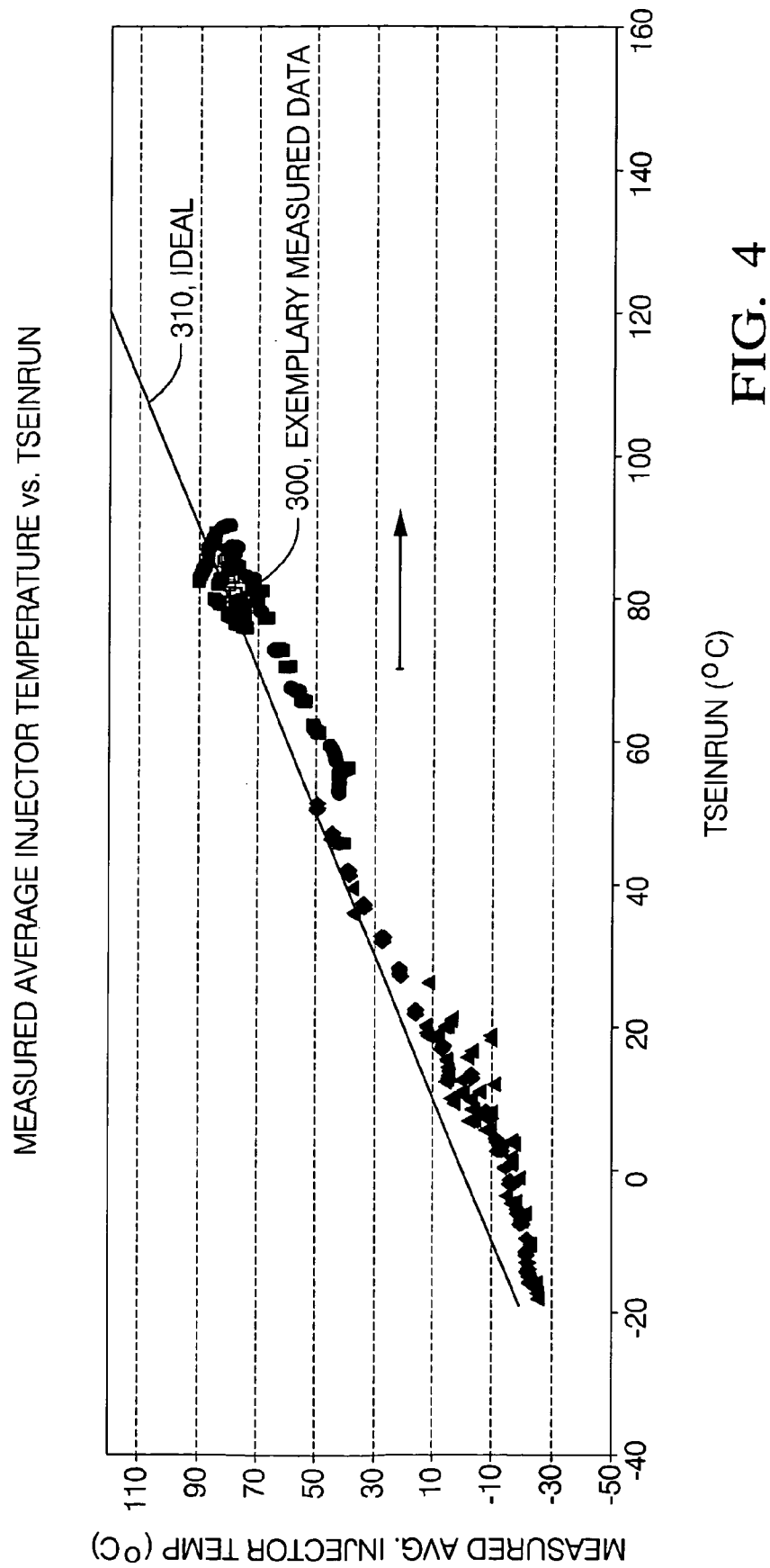

The temperature of gas in the intake runner 25 is determined by the controller (Block 204). The temperature of gas in the intake runner (hereinafter TSEINRUN) is defined as the temperature of intake gases immediately upstream of the fuel injector 36, at a point substantially near where the intake gases first come into contact with fuel spray flowing out of the fuel injector 36. During preproduction engine calibration and development, the intake runner gas temperature (TSEINRUN) is preferably measured directly using a thermocouple and accompanying data acquisition system. An example of such results is shown with reference to FIG. 4. As described hereinafter, this temperature of intake gases immediately upstream of the fuel injector 36 is preferably estimated by the engine controller 10 during operation of a production engine and control system. Using results acquired during the preproduction engine calibration and development, an estimation of TSEINRUN is determined, based upon measured engine operating conditions, estimated engine operating conditions, and preexisting calibrations, and is calculated using the following equation:

$$TSEINRUN = T_{CLT} - \{HTC[RPM, P_{EXH}/MAP] * R_{CF}[T_{CLT}] * (T_{CLT} - INT)\}$$

Wherein:

| | |
|---|---|
| TSEINRUN = | Intake runner gas temperature (° C.) |
| $T_{CLT}$ = | Engine coolant temperature (° C.) |
| HTC[RPM, $P_{EXH}$/MAP] = | Heat Transfer Coefficient (° C./° C.) |
| $R_{CF}[T_{CLT}]$ = | Runner correction factor (unitless) |
| $T_{INT}$ = | Intake manifold gas temperature (° C.) |

The measured engine operating conditions to determine TSEINRUN include engine coolant temperature ($T_{CLT}$), preferably measured with the coolant temperature sensor 51; air inlet temperature (IAT), preferably measured with the intake air temperature sensor 13; engine speed (RPM), preferably measured with the crank sensor 34; and engine load (MAP), preferably determined by the engine controller using measurements from the manifold absolute pressure sensor 24, throttle position sensor (not shown), the intake air temperature sensor 13, and the mass air flow sensor 13, when used. Engine operating conditions that are estimated using algorithms in the controller include exhaust manifold pressure ($P_{EXH}$) and intake manifold gas temperature ($T_{INT}$), in this embodiment.

The exhaust manifold pressure ($P_{EXH}$) is preferably estimated using a pneumatic state estimation program implemented and executed in the engine controller using algorithms and calibrations, which has been described in detail in commonly owned U.S. Pat. No. 5,845,627: Internal Combustion Engine Pneumatic State Estimator, issued to Olin, et al. This patent has been incorporated by reference hereinabove, and need not be fully described in detail herein.

The intake manifold gas temperature ($T_{INT}$) is preferably estimated using a thermal state estimation program implemented and executed in the engine controller using algorithms and calibrations, which has been described in detail in commonly owned U.S. Pat. No. 5,931,140: Internal Combustion Engine Thermal State Model, issued to Maloney. This patent has been incorporated by reference hereinabove, and need not be fully described in detail herein.

The Heat Transfer Coefficient HTC[RPM, $P_{EXH}$/MAP] is an indication of heat transfer from the intake runner 25 to the gas passing therethrough, based upon various characteristics of the specific engine design. In this embodiment, the Heat Transfer Coefficient HTC[RPM, $P_{EXH}$/MAP] preferably comprises a predetermined calibration that is determined as a function of engine mass air flow, and is based upon engine speed (RPM) and pressure drop ($P_{EXH}$/MAP) across the cylinder. The Heat Transfer Coefficient calibration employs a simple physical heat transfer model of gas flowing through a pipe to estimate heat transfer from the intake runner to the gas contained therein, and corresponding effect upon the gas temperature. A skilled practitioner is able to determine the heat transfer coefficient using the following equation:

$$HTC[RPM, P_{EXH}/MAP] = (T_{PIPE} - T_{OUTLET})/(T_{PIPE} - T_{INLET}),$$

wherein $T_{PIPE}$ is the temperature of the wall of the pipe, which in this case is the manifold runner 25, $T_{OUTLET}$ is the temperature of the gas flowing out of the manifold runner 25, and $T_{INLET}$ is the temperature of the gas flowing into the manifold runner 25. Data comprising temperatures corresponding to $T_{PIPE}$, $T_{OUTLET}$, and $T_{INLET}$ are preferably measured on a representative engine appropriately instrumented with thermocouples and other sensors operable to determine $P_{EXH}$ and MAP, along with an accompanying data acquisition device. The engine is operated at a series of engine operating points over a wide range of engine speed and load conditions which correspond to a range of air flow conditions. A scalar heat transfer coefficient value is calculated for each of the operating points, demarcated by engine speed, RPM, and pressure drop ($P_{EXH}$/MAP) across the cylinder. A skilled practitioner is able to create the heat transfer coefficient table, comprising a matrix of scalar values that is calibrated into the engine controller 10. Development and calculation of heat transfer coefficients, and calibration of a table of scalar terms into a matrix or table in the controller, is known to one skilled in the art.

The Runner Correction Factor (unitless) $R_{CF}[T_{CLT}]$, is a correction to Heat Transfer Coefficient HTC[RPM, $P_{EXH}$/MAP] based upon coolant temperature, $T_{CLT}$. It is initially calibrated at a value of 1.0. During preproduction development and calibration, the representative engine 5 is operated over a range of ambient conditions, during warm-up, i.e. during the period when the coolant temperature experiences a transition from near ambient temperature to a warmed-up steady operating temperature. The Runner Correction Factor (unitless) $R_{CF}[T_{CLT}]$ is calculated over a range of coolant temperatures to minimize effect of temperature variation during engine warm-up on heat transfer from the intake runner 25 to the intake gas. The coolant temperature is measured, along with a corresponding correction in mass flow of fuel necessary to maintain engine air/fuel ratio at or near stoichiometry at that temperature. The Runner Correction Factor (unitless) $R_{CF}[T_{CLT}]$ eliminates a need for correction of mass flow of fuel necessary to maintain engine air/fuel ratio at or near stoichiometry when the measured coolant temperature is below warmed-up steady-state temperature.

The controller 10 preferably selects one of the compensation terms based upon the calculated mass of fuel and the determined gas temperature in the intake runner (TSEINRUN) of the cylinder. Referring now to FIG. 3, an exemplary precalibrated table is shown that preferably exists in the controller. The exemplary precalibrated table contains a matrix of injector compensation terms, selectable based upon calculated mass of fuel, translated into injector open time or base pulsewidth (in units of milliseconds) and the determined gas temperature (in units of Kelvin) in the intake runner (TSEINRUN). The values in the table are generated by a skilled practitioner during preproduction engine development and calibration. The development of calibration values requires temperature of at least one fuel injector and temperature of its intake runner to be measured, along with a corresponding correction in mass flow of fuel necessary to maintain the desired engine air/fuel ratio, typically at or near stoichiometry. Each of the compensation terms is calculated to substantially effectively eliminate a need for the correction of injector base pulsewidth (or mass flow of fuel) necessary to maintain engine air/fuel ratio at or near stoichiometry at the measured temperature and mass flow conditions. Referring again to FIG. 4, the exemplary relationship between measured average fuel temperature and estimated intake runner temperature TSEINRUN is shown, including an ideal relationship 310 (i.e. wherein the measured average fuel temperature equals the estimated intake runner temperature TSEINRUN), and measured data 300 for an exemplary system.

The controller 10 preferably adjusts the calculated mass of fuel to be delivered to the cylinder using the selected compensation term, referred to in FIG. 3. In this embodiment, the adjusting comprises multiplying the calculated mass of fuel to be delivered by the selected compensation term, to arrive at the adjusted calculated mass of fuel.

The controller 10 preferably controls open time of the corresponding fuel injector 36 based upon the adjusted calculated mass of fuel, such that the adjusted calculated mass of fuel is delivered to the cylinder for combustion. The controller effects fuel flow through the injector 36 by controlling power to an injector solenoid (not shown). When the injector solenoid is powered, or actuated, a pintle opens in the injector, permitting fuel flow. The open time, or base pulsewidth, is typically the elapsed time during when the injector solenoid is powered. Injector flow stops subsequent to when the controller discontinues power to the solenoid, which results in a return spring causing the injector pintle to close and cut off fuel flow. This process of controlling fuel injector open time, and associated fuel flow, is known to one skilled in the art.

Alternatively, when the internal combustion engine is a direct fuel injection engine, i.e., either a direct injection spark-ignition engine or a compression-ignition engine, the intake runner gas temperature term, TSEINRUN, may be replaced with an estimated temperature of the air intake valve 26. The estimated temperature of the air intake valve 26 is preferably estimated using a method to estimate temperature of an air intake valve implemented and executed in the engine controller using algorithms and calibrations, which has been described in detail in commonly owned U.S. Pat. No. 6,003,496: Transient Fuel Compensation, issued to Maloney. This patent has been incorporated by reference hereinabove, and need not be fully described in detail herein.

Although this invention is described in reference to a closed loop control system, it is understood that alternate embodiments of this invention may be implemented to control fuel when the engine controller is controlling the engine in an open loop and in a closed loop fuel control mode. Furthermore, the invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. A system for controlling fuel delivery through a fuel injection system of an internal combustion engine, comprising:
    an internal combustion engine, comprising:
        a plurality of cylinders,
        an air intake system with a plurality of intake runners, each intake runner corresponding to one of the plurality of cylinders and fluidly attached thereto, and,
        a fuel injection system comprising a plurality of fuel injectors, each fuel injector fluidly connected and operable to deliver a quantity of fuel to one of the plurality of intake runners, and operably connected to an engine controller;
    wherein the engine controller is operable to:
        calculate a mass of fuel for delivery to one of the plurality of cylinders through one of the plurality of fuel injectors, based upon the operation of the internal combustion engine,
        determine gas temperature in the cylinder;
        select a compensation term based upon the calculated mass of fuel and the determined gas temperature in the cylinder;
        adjust the calculated mass of fuel using the compensation term; and,
        control an open time of each fuel injector based upon the adjusted calculated mass of fuel, such that the adjusted calculated mass of fuel is delivered to the one of the plurality of cylinders.

2. The system of claim 1, wherein the internal combustion engine is a port fuel injection spark-ignition engine.

3. The system of claim 1, wherein the internal combustion engine is a spark-ignition engine designed to operate primarily at stoichiometry.

4. The system of claim 1, wherein the internal combustion engine is a direct-injection spark-ignition engine.

5. The system of claim 1, wherein the internal combustion engine is a combustion-ignition engine.

6. A method to control delivery of fuel to an internal combustion engine, comprising:
   calculating a mass of fuel for delivery to a cylinder of the internal combustion engine;
   determining an intake gas temperature in the cylinder;
   selecting a compensation term based upon the calculated mass of fuel and the determined gas temperature to the cylinder;
   adjusting the calculated mass of fuel for delivery with the selected compensation term; and,
   delivering an amount of fuel to the internal combustion engine based upon the adjusted calculated mass of fuel for delivery.

7. The method of claim 6, wherein selecting a compensation term based upon the calculated mass of fuel and the determined gas temperature in the cylinder comprises selecting the compensation term from a calibration table containing a matrix of compensation terms.

8. The method of claim 7, wherein each compensation term from the matrix of compensation terms contained in the calibration table is generated using a representative engine, comprising:
   operating the representative engine at one of a series of operating conditions;
   measuring temperature of a fuel injector of the representative engine;
   measuring temperature of an intake runner of the representative engine in which the fuel injector is inserted;
   measuring the engine air/fuel ratio; and,
   determining a scalar compensation term necessary to maintain the engine air/fuel ratio near stoichiometry at the measured fuel injector temperature and the measured intake runner temperature.

9. The method of claim 6, wherein adjusting the calculated mass of fuel for delivery with the compensation term comprises multiplying the calculated mass of fuel by the selected compensation term.

10. The method of claim 6, wherein delivering an amount of fuel to the internal combustion engine based upon the adjusted calculated mass of fuel for delivery comprises controlling open time of a fuel injector operable to deliver a quantity of fuel to the intake runner based upon the adjusted calculated mass of fuel, such that the adjusted calculated mass of fuel is delivered to the cylinder.

11. The method of claim 6, wherein determining gas temperature in the cylinder comprises estimating the gas temperature in the intake runner of the cylinder based upon engine operating conditions and engine calibrations.

12. The method of claim 6, wherein determining gas temperature in the cylinder comprises estimating a temperature of an intake valve.

* * * * *